United States Patent [19]

Sverdlin

[11] Patent Number: 4,652,186

[45] Date of Patent: Mar. 24, 1987

[54] PORTABLE BORING MACHINE

[76] Inventor: Anatoly Sverdlin, 2018 Willow Wisp, Seabrook, Tex. 77586

[21] Appl. No.: 671,636

[22] Filed: Nov. 15, 1984

[51] Int. Cl.[4] ............................................. B23B 41/12
[52] U.S. Cl. ...................................... 408/81; 408/79; 408/138; 408/54; 408/708
[58] Field of Search ...................... 408/79, 80, 81, 138, 408/238, 705, 54, 72, 708, 1 R, 186; 82/1.2, 4 R, 4 C; 144/99

[56] References Cited

U.S. PATENT DOCUMENTS

| | | | |
|---|---|---|---|
| 200,071 | 2/1878 | Love | 408/137 |
| 744,286 | 11/1903 | Boardman | 408/137 |
| 1,217,481 | 2/1917 | Mewes | 82/1.4 |
| 1,376,451 | 5/1921 | Martell | 408/234 |
| 1,973,386 | 9/1934 | Morgan | 82/1.4 |
| 2,401,838 | 6/1946 | Mitchell | 408/54 |
| 2,638,802 | 5/1953 | Froussard | 408/109 |
| 2,651,221 | 9/1953 | Foster | 408/708 |
| 4,451,186 | 5/1984 | Payne | 408/54 |

FOREIGN PATENT DOCUMENTS

| | | | |
|---|---|---|---|
| 657766 | 3/1938 | Fed. Rep. of Germany | 408/708 |
| 662285 | 7/1938 | Fed. Rep. of Germany | 408/80 |
| 14939 | of 1915 | United Kingdom | 408/81 |

*Primary Examiner*—Gil Weidenfeld
*Assistant Examiner*—Daniel W. Howell
*Attorney, Agent, or Firm*—Vinson & Elkins

[57] ABSTRACT

A portable boring machine for boring bearing housings in situ includes a pair of spaced apart mounting members for adjustably positioning a boring bar within a row of bearing housings. The spaced apart mounting members are removably positionable on the boring bar and permit rotation of the boring bar with respect to the housings. The mounting members include radially adjustable jaws which enable the space between the boring bar and an adjacent bearing housing to be adjusted by the user in order to adjust the position of the boring bar within the housing and to vary the inclination of the boring bar with respect to the row of housings to be reconditioned. In this way the user has complete control between the relative positions of the boring bar and the bedplate. Moreover, since the support members are removably positionable on the boring bar they may be adjusted in position with respect to the particular housing to be bored. A boring head, concentrically mounted about the boring bar, is rotated about the housings as the boring bar is rotated and is translated along the length of the boring bar by way of a rotatable screw mechanism contained within the boring bar. The boring head is secured about the boring bar by a split ring whose free ends may be fastened by a threaded fastener. The boring bar may be supported intermediately by an intermediate support that includes a plurality of radially outwardly extending, adjustable fingers. The boring bar and its screw may be rotated at different rates through a single motor and a geared planetary drive mechanism.

15 Claims, 8 Drawing Figures

PORTABLE BORING MACHINE

BACKGROUND OF THE INVENTION

1. Field of the Invention

This invention relates generally to the in situ machining of the main bearing housings of large internal combustion engines, turbine casings, bearing housings of reduction gears, stern tubes and stern bearings of ships, and other large pieces of machinery which cannot be transported practically to machine shops for repairs.

2. Brief Description of Background Art

A number of apparatus for commercially available for in situ refinishing of the surfaces of the main bearing housings of very large internal combustion engines or other large machine elements which require line boring in place. In these engines a plurality of thin insert shell or ball bearings are situated in axially spaced alignment along the length of the shafts or a crankshaft main journals. These plain shells or other types of bearings rest inside the bearing housings to carry shafts or crankshafts rotating at high speeds with high loads.

A boring bar is inserted into the bearing housings after the crankshaft or other rotating element has been removed from the bedplate or casing. Because of the great size of these engines, the boring bar may be on the order of 30 feet or longer in length. Apparatus of this kind may be utilized in reboring, in situ, the main bearing housings, turbine casings, turbine bearing housings of diesel marine engines, reduction gear casings, stern tubes of ships and other large scale machine parts. Because of their large size, transportation of these parts to a machine shop may be impractical.

Conventionally in such devices a boring bar is rotated from an exterior position. The boring bar carries one boring element which extends radially from the boring bar to refinish the bearing housing surface as the boring bar is rotated. Since the boring bar may be positioned within the bedplate, the boring element may be repositioned to successively bore different bearing housings in a sequential fashion without repositioning the boring bar.

However with conventional commercially available devices it is sometimes very difficult to align the boring bar with respect to the bearings to be refinished. Specifically it is very difficult to alter the inclination of the boring bar with respect to the bearing housings so that an exact alignment is achieved. This may result in misalignment of the boring bars, excessive boring, or excessive time consumption in attempting to refinish a given machine.

SUMMARY OF THE INVENTION

It is a primary object of the present invention to provide an economical and efficient portable boring machine for reconditioning the bearings housings of large internal combustion engines and other large machine components requiring line boring with high accuracy.

Still another object of the present invention is to provide such a machine which facilitates the adjustment of the inclination of the boring bar with respect to the bedplate or other bearing housing carrier.

It is also an object of the present invention to provide such a machine that simplifies the accurate positioning of a boring bar.

Yet another object of the present invention is to provide such a device with an intermediate support variably positionable along the boring bar.

Still another object of the present invention is to accomplish such a machine which can absorb reactive thrust forces from the boring bar that occur during machining.

These and other objects of the present invention may be achieved by a portable boring machine for the in situ boring of the bearing housings, having a centerline therethrough. The machine includes an elongate boring bar with a radially outwardly directed boring head mounted on the bar for rotation therewith and axial movement therealong. A pair of axially spaced bar mounting members are coupled to the bar and are arranged to releasably mount in respective ones of said bearing housings whereby the bar may be rotated over a bearing housing to be bored. At least one of the mounting members includes an apparatus adapted to enable adjustment of the position of the bar with respect to the centerline without disconnecting the mounting members from the respective bearing housings.

DESCRIPTION OF A PREFERRED EMBODIMENT

Figure 1:
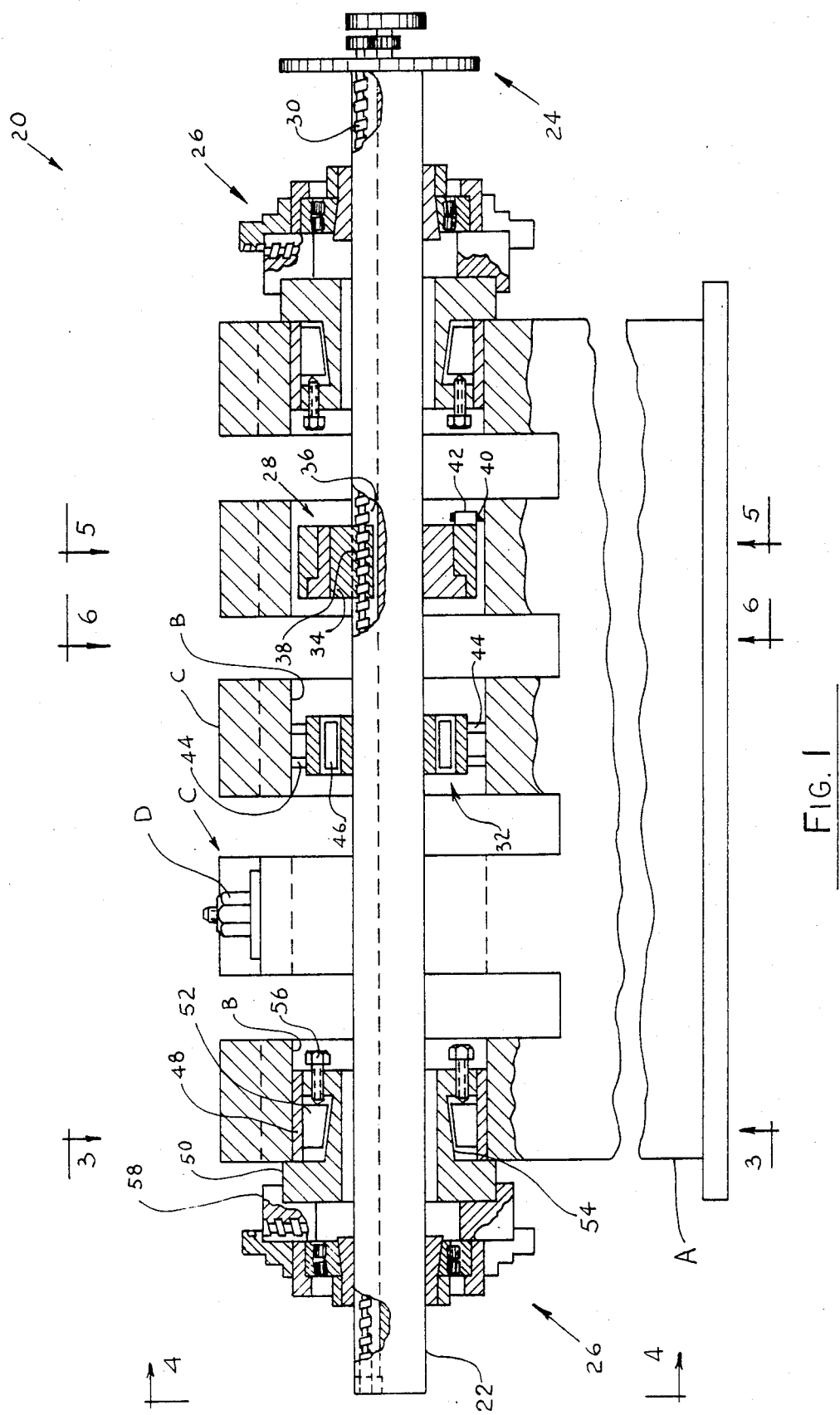
FIG. 1 is a partially broken away, vertical cross-sectional view taken centrally thorugh one embodiment of the present invention.

Referring to the drawing wherein like reference characters are utilized for like parts throughout the several views, a portable boring machine 20, shown in FIG. 1, includes a boring bar 22, a planetary drive mechanism 24, a pair of spaced apart support members 26 and an intermediate boring head 28. The machine 20 is shown in position in situ within the bedplate A of a large scale internal combustion engine, such as a diesel marine engine. The bedplate or engine body A includes a plurality of bearing housings B, each of which includes a removable cap C. The large bolts and nuts D secure the caps C to the remainder of the housings B. The bedplate A is illustrated with the crankshaft removed.

The boring bar 22 is sized to extend completely through the bedplate A. The planetary drive mechanism 24 is connected to a screw 30 rotatably mounted within the interior of the bar 22. The screw 30 engages the boring head 28 by way of its leading screw nut 34 which slides within a groove 36 located on the boring bar 22. The nut 34 includes threads 38 which mate with the threads of the screw 30 so that as the screw 30 rotates, the nut 34 moves axially along the boring bar 22. The boring head 28 includes a radially outwardly positioned boring tool 40 mounted by a pin 42.

An intermediate support 32 concentrically encircles the exterior of the boring bar 22. The support 32 includes a plurality of outwardly extending fingers 44 which are adjustable to provide spacing and support of the bar 22 at an intermediate position between the support members 26. Relative rotation is possible between the fingers 44 and the remainder of the intermediate support 32 through the use of the split roller bearings 46. In this way contact may be made at an intermediate position along the boring bar 22 with the inside of the bearing housing B so that the tendency of the boring bar 22 to sag is controlled.

Figure 3:
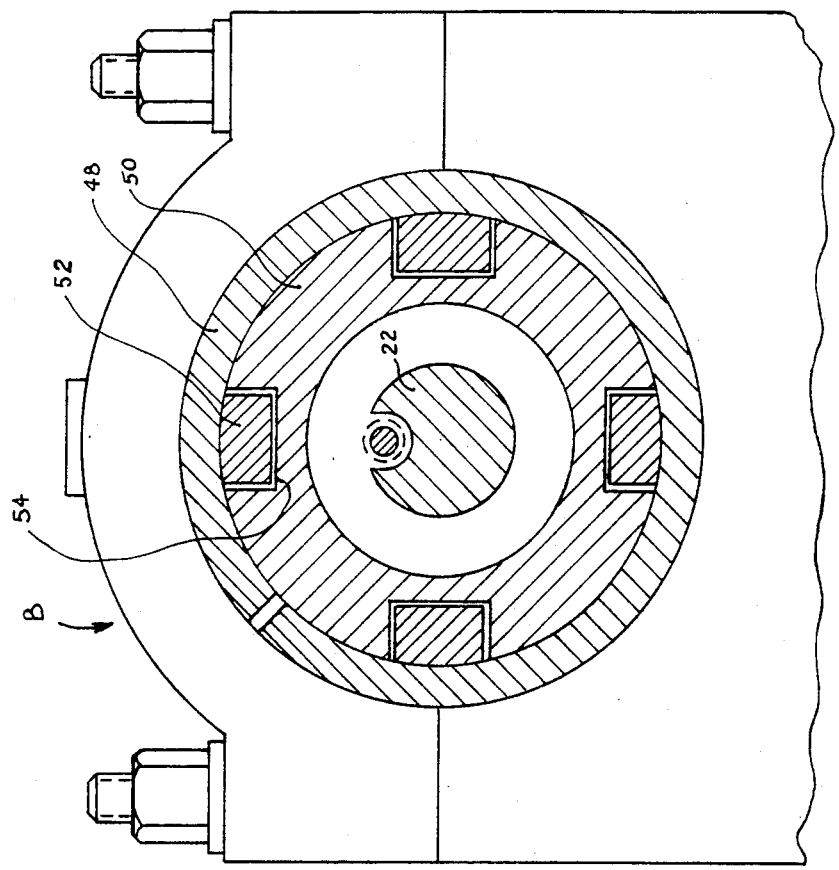
FIG. 3 is an enlarged cross-sectional view taken generally along the line 3—3 in FIG. 1.

The spaced apart support members 26 are identical with each member engaging the boring bar 22 at one point and an adjacent or end bearing housing B at another point. The members 26 concentrically encircle the boring bar 22 while they are adapted to be concentrically encircled by the adjacent bearing housings B. As shown in FIGS. 1 and 3, each member 26 includes a split sleeve 48 which is maintained in contact with the interior of the bearing housing B. A wedge chuck carrier 50 secures the member 26 to the bearing housing B through the radially outwardly generated pressure produced by the engagement between the four wedges 52 and the inclined inner wall 54 of the carrier 50. The outward pressure may be adjusted by axially threading the jacking bolts 56 with respect to the carrier 50 to appropriately bias the wedges 52 against the sleeve 48.

Figure 2:
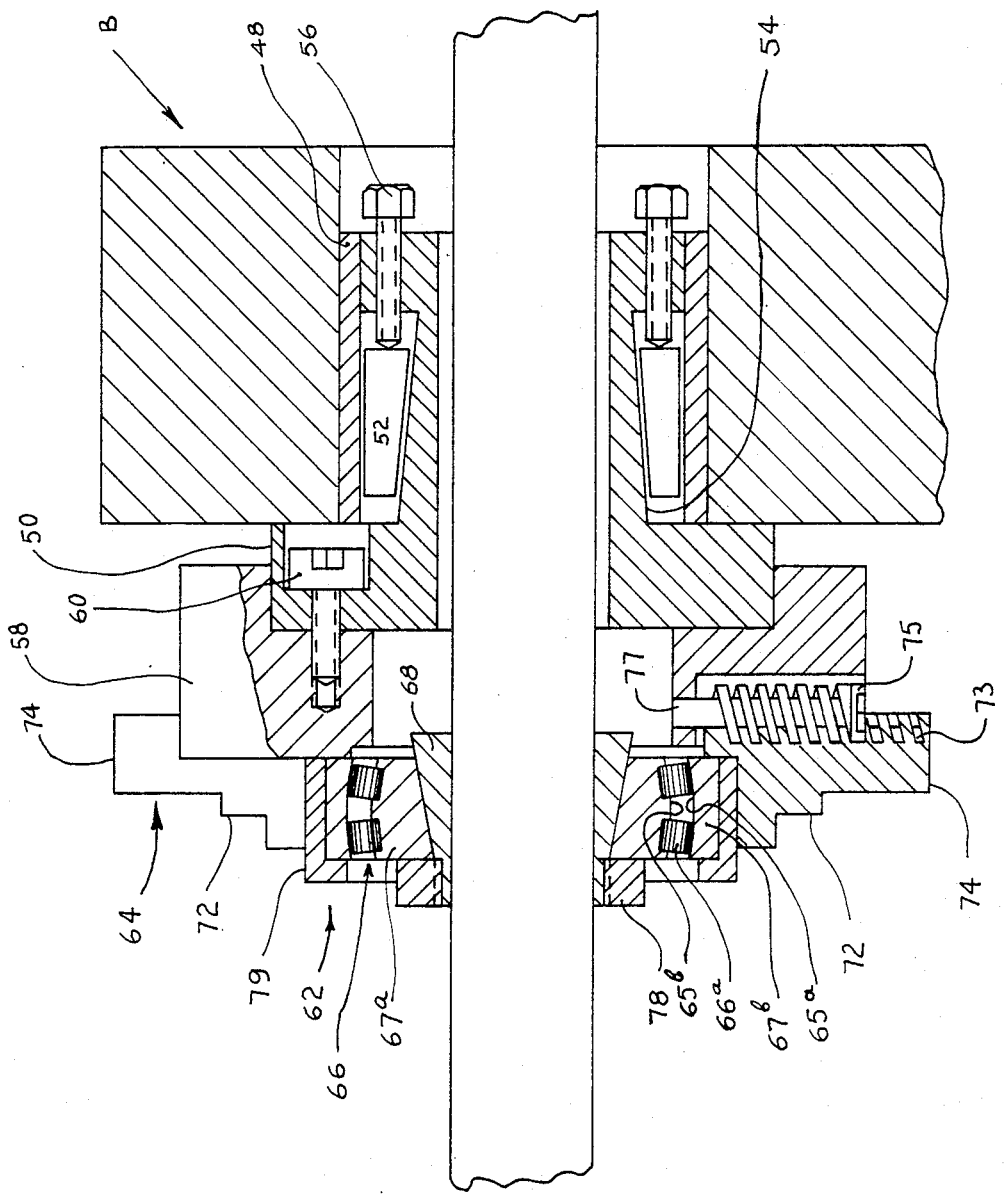
FIG. 2 is an enlarged cross-sectional view corresponding to the left end portion of the embodiment shown in FIG. 1.

As shown in FIG. 2, the wedge chuck carriers 50 are connected to the four jaw chuck socket 58 by threaded fasteners 60. Each socket 58 is spaced from the boring bar 22 and connects the carrier 50 to boring bar contacting chuck 62 of each support member 26.

Figure 4:
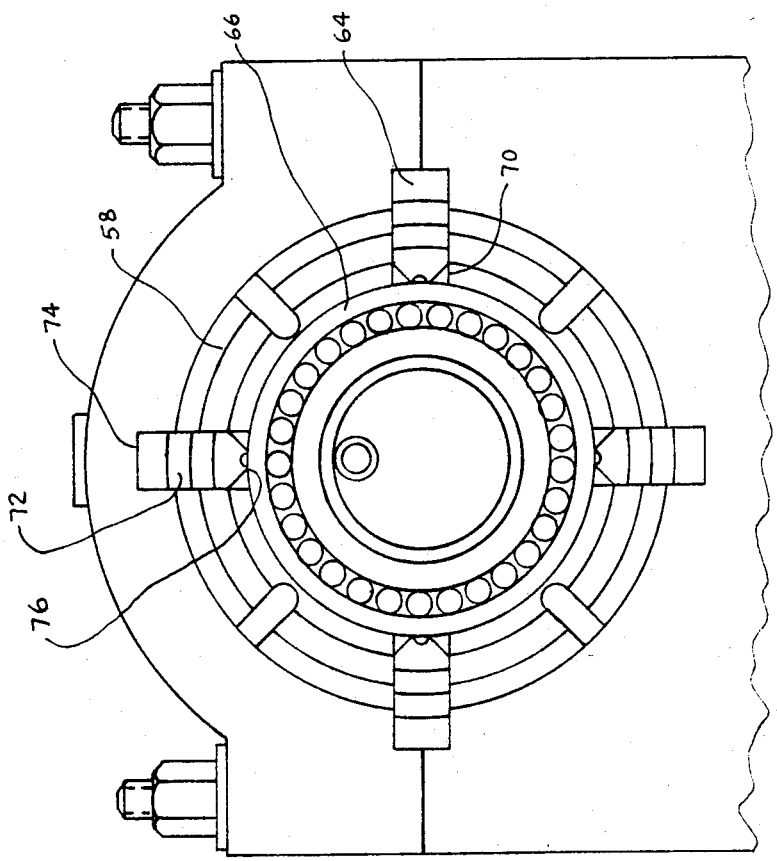
FIG. 4 is an enlarged cross-sectional view taken generally along the line 4—4 in FIG. 1.

The chuck 62 includes a plurality of circumferentially spaced, radially aligned, jaws 64, a self-aligning bearing 66, and an split tapered adapter sleeve 68. As shown in FIG. 4, the jaws 64 slide within annularly spaced apart, T-shaped grooves 70 in the outward face of each chuck 62. The grooves 70 are arranged to permit radial adjustment of the position of the jaw 64 with respect to the sleeve 79 surrounding the bearing 66. While four such jaws 64 are illustrated, separated by 90 degrees with respect to one another, a number of additional slips 64 may be utilized if desired.

Each jaw 64 includes a stepped outer face 72, a threaded inner face 73, a hardened end 74 and a toothed contacting surface 76. A threaded pin 75 is journalled at 77 in the socket 58 while threadedly engaging the threaded inner face 73 of a jaw 64, as shown in FIG. 2. Thus, each jaw 64 may be threaded radially along the groove 70, by rotating the pin 75 until the contacting surfaces 76 engage the sleeve 79 surrounding the roller bearing 66.

Contact with the boring bar 22 is provided by the split tapered adapter sleeve 68 which tapers outwardly from the boring bar 22 as it extends inwardly into the support member 26. The roller bearing 66 is then mounted concentrically about the tapered adapter sleeve 68 and is secured thereto by a threaded locking nut 78. As the locking nut 78 is rotated, it pulls the adapter sleeve 68 into the tapered inner race 67a of the bearing 66. Thus the boring bar 22 is free to rotate with respect to the outer race of the roller bearing 66 which may be held stationary through contact with the jaws 64. Advantageously, the bearing 66 is a spherical self-aligning bearing which permits some tilting of the boring bar 22 with respect to the adjacent bearing housing B. The outer race 67b of the bearing 66 has an inner concave surface 65a and the inner race 67a has a convex surface 65b, that together allow a change of the angular position of the boring bar 22 while the chuck 62 on either side of the boring bar 22 remains stationary. The bearing 66 also includes a series of rollers 66a whose axes of rotation are inclined slightly to the length of the bar 22. The spherical self-aligning bearing 66 also absorbs the reactive thrust force from the boring bar 22 during machining.

Figure 5:
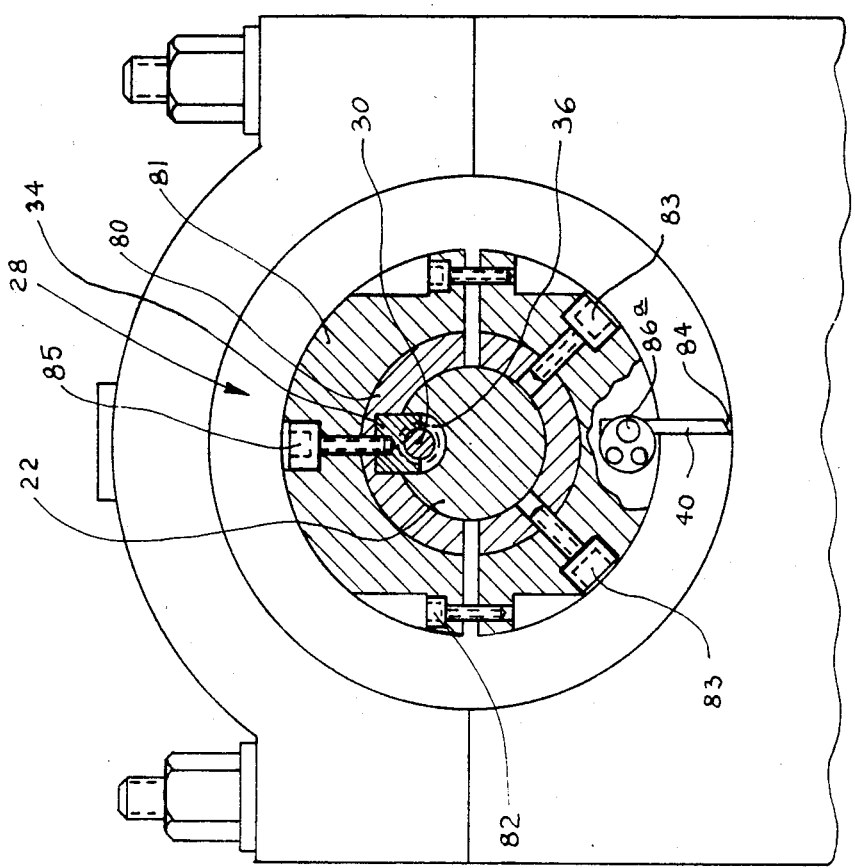
FIG. 5 is an enlarged cross-sectional view taken generally along the line 5—5 in FIG. 1.

The boring head 28, shown in FIG. 5, is mounted on the boring bar 22 for rotation with respect thereto about the longitudinal axis of the boring bar 22. The nut 34 threadedly engages and encircles the screw 30 of the boring bar 22. The nut 34 is held in a bronze split annular ring 80 which encircles the boring bar 22. The nut 34 also slides along an upwardly opening slot 36 formed in the boring bar 22. Another split annular ring 81 sandwiches the ring 80 about the boring bar 22 by way of the generally tangentially oriented bolt and nut 82 which connect the free ends of the annular ring 81. The bolts 83 tie the ring 81 to the ring 80 and the bolt 85 ties the nut 34 to the rings 80 and 81. The boring tool 40 includes a bevelled point 84 and an adjustable milling tool holder 86a to enable adjustment of the extension of the tool 40.

Figure 6:
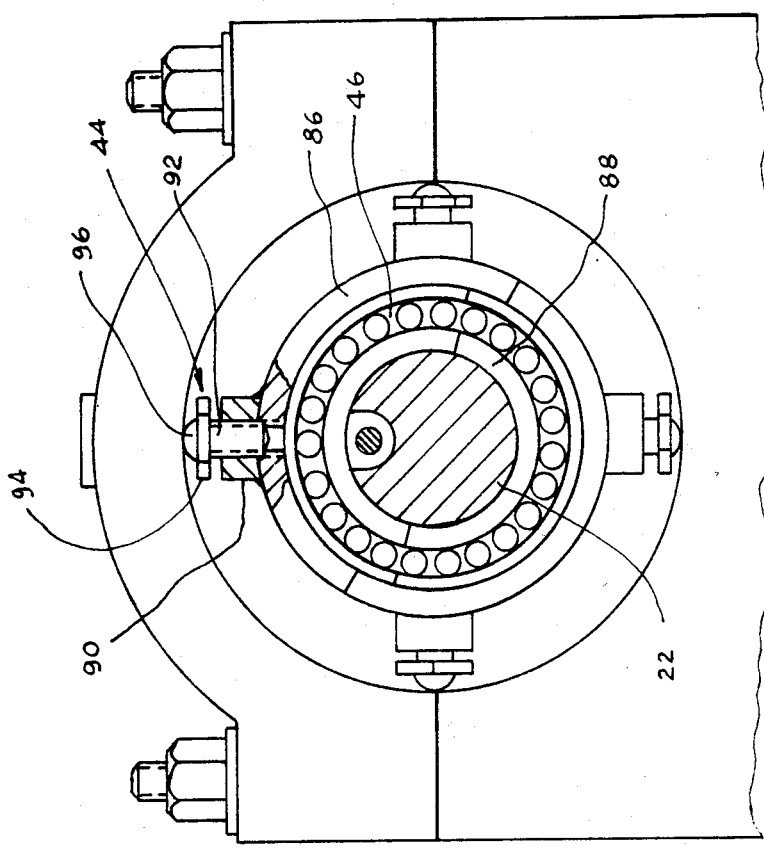
FIG. 6 is an enlarged cross-sectional view taken generally along the line 6—6 in FIG. 1.

The intermediate support 32, shown in FIG. 6, is slidably adjustably positionable along the length of the boring bar 22. Two axially spaced sets of fingers 44 threadedly engage a two-part carrier ring 86 which serves as the carrier for the split roller bearing 46. Thus, the two-piece inner race 88 of the roller bearing 46 is free to rotate with the boring bar 22 and with respect to the outer two-piece ring 86. The outer ring 86 and inner race 88 are threadedly connected by bolts (not shown) at their opposed free ends.

Each of the fingers 44 of a set is circumferentially spaced from one another and extends radially outwardly from the two-part carrier ring 86. Each finger 44 includes a base 90, a threaded bolt 92, and an enlarged head 94 with a convex outwardly facing surface 96. Thus, the head 94 may be engaged by a wrench to adjust the threaded engagement between the bolt 92 and the base 90 to extend the convex outwardly facing surface 96 to the desired extent so as to contact the inside surface of the bearing housing B. When each of the fingers 44 has been appropriately adjusted, the boring bar 22 is supported at an intermediate point along its length. Since the intermediate support 32 slides freely along the length of the boring bar 22 after the inner bearing race 88 is loosened, it may be positioned as desired within any of the intermediate bearing housings B to provide support as necessary for the boring operation. However it is preferable, as shown in FIG. 1, to position the intermediate support 32 at a location as close as possible to the site of the boring operation. For very long bars 22 it is necessary to provide a pair of supports 32, one on each side of the boring head 28.

Figure 8:
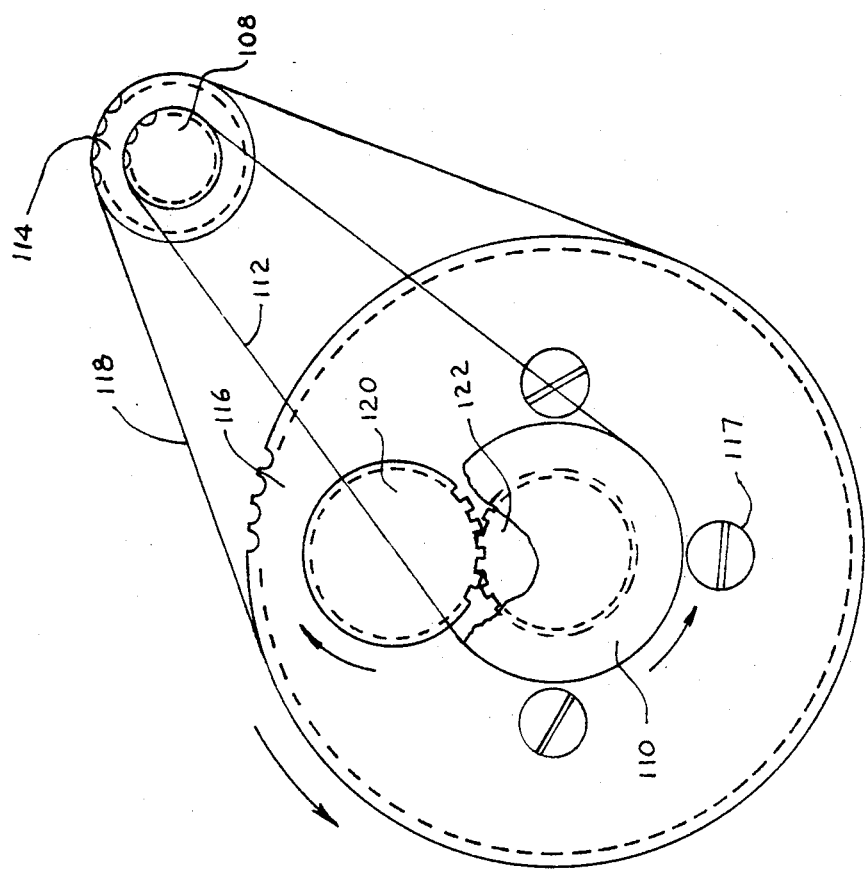
FIG. 8 is a partially sectioned end view of the mechanism shown in FIG. 7.
Figure 7:
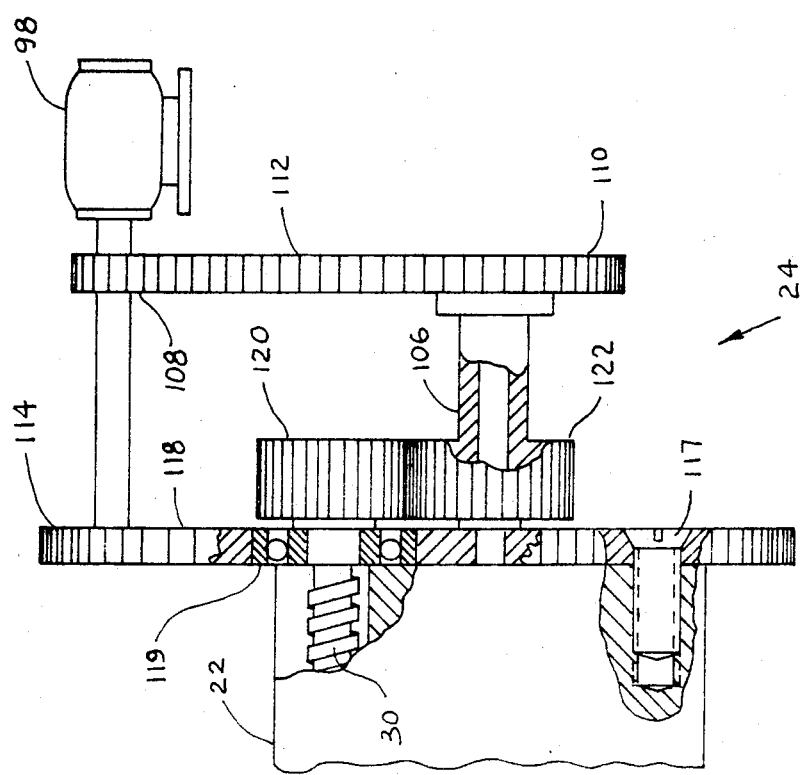
FIG. 7 is a cut-away, enlarged front elevational view of the driving mechanism for the boring bar as shown in FIG. 1.

The rotation of the boring bar 22 and the screw 30 is controlled by the planetary drive mechanism 24. As shown in FIGS. 7 and 8, the drive mechanism 24 includes a variable speed motor 98 with a shaft. Two driven chain sprockets 108 and 114 may be tight fitted to the shaft. The drive chain sprocket 114 is engaged by roller chain 118 with a driven sproket 116. The driven roller chain sprocket 116 is bolted to the boring bar 22 by screws 117.

A hollow shaft 106 centered on the axis of rotation of the boring bar 22. On one end of the shaft 106 is a tightly fitted spur gear 122. On the other end, a driven sprocket 110 is engaged by a roller chain 112 that also engages the sprocket 108. The spur gear 122 engages the drive spur gear 120 which is rigidly fixed on the end of the lead screw 30. However, the lead screw 30 rotates freely within ball bearings 119 together with the spur gear 120.

Thus, rotation of the sprocket 110 on the shaft 106 results in rotation of the spur gear 122 which in turn mates with the spur gear 120. This results in rotation of the lead screw 30 which provides longitudinal feed to the boring head 28.

The drive mechanism 24 enables planetary multiplication or demultiplication. Thus, the rotating speeds of the boring bar 22 and the longitudinal feed of the boring head 28 may be widely varied.

The portable boring machine 20 may be utilized in generally the following fashion. Initially the engine is broken down to expose the bedplate A and to remove the crankshaft and the bearing shells from the bedplate A. With the caps C removed, the boring bar 22 may be positioned within the housings B. The caps C may then be reattached over the boring bar 22.

The boring bar 22 is aligned within the housings B by initially securing the sleeves 48 around wedge chuck carriers 50 within the outside bearing housings B, as indicated in FIG. 1. The screws 56 are tightened to expand and thereby secure the wedges 52 against the sleeves 48 so that firm contact is attained with the housing B.

The precise positioning of the boring bar 22 may be completed by securing each chuck 62 about the boring bar 22. This may be achieved by initially positioning the adapter sleeve 68 in contact with the boring bar 22 and then encircling the sleeve 68 with the self-aligning bearing 66. The bearing 66 is then locked in place by securing the annular locking ring 78. At this point the chuck socket 58 is connected to the bearing 66 through the use of the jaws 64. Each of the jaws 64 is slid into a T-shaped groove 70 in the socket 58 until the contacting surfaces 76 engage the exterior of the bearing 66. The jaws 64 are then tightened radially inwardly against the sleeve 79 by rotating the threaded pins 75. In this configuration the boring bar 22 is free to rotate with respect to the bearing housings B. However the particular orientation selected for the boring bar 22 is now set subject to finer adjustment.

The relative position of the boring bar 22 in a vertical plane may then be adjusted by simply adjusting the threading of the various threaded pins 75. More specifically, each end of the bar 22 can be displaced in fine increments to the left or the right, and up or down. This enables fine adjustment of the original orientation set by the wedges 52. The bar 22 may be slightly tilted at one end only with respect to the other end through adjustment of one of the support members 26, because the bearings 66 provide for a certain amount of self-adjustment. Thus, the position of the bar may be adjusted with respect to the centerline extending through the bearing housings B. More importantly, this adjustment may be made without the necessity of disconnecting the mounting members 26 from the bearing housings B.

With both spaced apart support members 26 in position within their respective bearing housings B, the intermediate support 32 is positioned within a bearing housing B adjacent the housing B to be bored. This may be accomplished simply by sliding the support 32 along the boring bar 22 until it is located adjacent the desired bearing housing B. In this position the threaded bolts 92 are adjusted with respect to the base 90 so that the convex outwardly facing surfaces 96 just contact the bearing housing when the support 32 is slid within the housings B. After the adjustment of the fingers 44 is complete, the intermediate support 32 is simply slid into position within the housing B, as shown in FIGS. 1 and 6. After placement within the housing B, the fingers 44 may, if desired, be tightened against the inside facing wall of the housing B.

Next the boring element 28 is appropriately positioned with respect to the bearing housing B. More specifically, the boring head 28 is positioned so that it is located at the edge of the bearing housing surface. This may be done by rotating the screw 30 to appropriately align the nut 34 with the housing B. The boring tool 40 is then moved across the bearing surface to be machined or refinished, at the appropriate depth.

The drive mechanism 24 is operated to rotate the screw 30 and boring bar 22 simultaneously. This causes translation of the boring element 28 axially along the boring bar 22 at the same time that the boring bar 22 itself is rotating. As a result, the tool 40 moves through a tight helical pattern of movement along the surface to be refinished. Thus, the boring tool 40 machines the bearing housing surface to the desired depth across the housing B. After one bearing housing B has been refinished, the boring head 28 and intermediate support 32 may be repositioned to proceed with the next boring operation in the same bedplate A. If necessary, the bearing housing surface may initially be coated with metal plating to first build up the surface so that the surface may be reconditioned to the standard size.

The portable boring machine 20 is also capable of boring or machining the outermost or end bearing housings B. Since the spaced apart support members 26 are removably and slidably attached to the boring bar 22, they may be moved and positioned instead within a housing adjacent the outermost bearing housing B. Meanwhile the boring head 28 may be located within the outermost bearing housing B in order to machine that housing. The operation of the apparatus 20 is otherwise identical to the operation described above.

With the present invention the adjustment of the relative position between the support members 26 is easily varied. This means that the inclination of the boring bar 22 with respect to the bedplate A may be varied in any fashion desired by the user. In addition the relative positions between the various support members 26, the boring head 28 and the intermediate support 32 may be freely interchanged. This is because all of these parts are fixed to the boring bar 22 to enable repositioning. This permits considerable flexibility and close adjustment of the boring bar 22 within the bedplate and the ability to adjust the operation to bedplates of many different sizes. In addition the machining of the outermost housings of an axially spaced array of bearing housings is considerably simplified.

While the present invention has been described with respect to a single preferred embodiment, those skilled in the art will appreciate a number of modifications and variations therefrom and it is intended within the appended claims to cover all such modifications and variations as come within the true scope of the present invention.

What is claimed is:

1. A portable boring machine for boring in situ a plurality of spaced axially aligned bearing housings on an internal combustion engine body after removal of a crankshaft from the engine body, the plurality of bearing housings including a pair of opposed end bearing housings and intermediate bearing housings between the end bearing housings; said portable boring machine comprising:

an elongate rotary boring bar mounted concentrically within said bearing housings and having ends extending outwardly from said opposed end bearing housings;

an end mounting member wholly supported by each of the end bearing housings and positioned between the boring bar and the associated end bearing housing for supporting the boring bar thereat, each end mounting member including an inner concentric portion engaging the boring bar and mounted for rotation therewith, an outer concentric portion engaging the inner surface of the adjacent end bearing housing and permitting relative rotation of said inner concentric portion and said boring bar, and adjusting means carried by said outer concentric portion for transverse adjustment of the longitudinal axis of the boring bar and inner portion relative to said outer concentric portion and bearing housings without disassembly of the end mounting members thereby to provide accurate alignment of the boring bar relative to the bearing housings; and a boring head mounted on said boring bar for rotation therewith to engage in cutting relation the inner surface of an adjacent bearing housing.

2. A portable boring machine as set forth in claim 1 wherein each of said mounting members includes self-aligning spherical bearings between said inner and outer concentric portions to permit adjustment of the boring bar relative to the adjacent bearing housing with the outer concentric portions remaining stationary with respect to the adjacent bearing housing.

3. A portable boring machine as set forth in claim 1 wherein said outer concentric portion carries a plurality of radially adjustable jaws to engage said inner concentric portion and thereby adjust the radial spacing between said first and second concentric portions for accurate positioning of said boring bar.

4. A portable boring machine as set forth in claim 1 wherein each end mounting member includes a chuck carrier fitting within the adjacent bearing housing and carrying said outer concentric portion, and a plurality of adjustable wedge elements are positioned within the adjacent bearing housing between said chuck carrier and the inner surface of the adjacent bearing housing; and manual means are provided to move the wedge elements along the longitudinal axis of the boring bar for securing the chuck carrier and associated end mounting member onto the engine body.

5. A portable boring machine for boring in situ a plurality of spaced axially aligned bearing housings on a fixed body after removal of a rotary shaft mounted on the bearing housings from the body, the plurality of bearing housings including a pair of opposed end bearings housings and intermediate bearing housings between the end bearing housings; said portable boring machine comprising:

an elongate rotary boring bar mounted concentrically within said bearing housings and having ends extending outwardly from the opposed end bearing housings of said plurality of axially spaced bearing housings;

an end mounting member wholly supported by said fixed body adjacent each of the end bearing housings positioned between the boring bar and the associated end bearing housing for supporting the boring bar thereat;

an annular boring head mounted on said boring bar to engage in cutting relation the inner surface of an adjacent bearing housing for rotation therewith and for axial movement therealong;

an annular intermediate mounting support positioned about said boring bar and mounted for sliding movement along the length of said boring bar for positioning within a selected bearing housing, said intermediate support having outer and inner concentric ring portions and bearings between said concentric ring portions to permit relative rotation therebetween, said outer ring portion carrying a plurality of radially adjustable members projecting from its outer periphery and adapted upon adjustment to engage the inner surface of a selected bearing housing for securing the intermediate support therein; and means to rotate said boring bar and to move said boring head axially along said boring bar during rotation of the boring bar.

6. A portable boring machine as set forth in claim 5 wherein said intermediate mounting support is split into a pair of arcuate portions removably connected to each other for disassembly and assembly about said boring bar;

said intermediate mounting support adapted to be disassembled and removed from one bearing housing and then to be reassembled accurately positioned within another adjacent bearing housing for supporting the boring bar therein.

7. A portable boring machine as set forth in claim 5 wherein said boring head is split into a pair of arcuate ring portions removably connected to each other for disassembly and assembly about said boring bar;

said boring head adapted to be disassembled and removed from one bearing housing after machining thereof, and then to be reassembled and accurately positioned within another adjacent bearing housing thereafter for machining the adjacent bearing housing.

8. In a portable boring machine for boring in situ a plurality of spaced axially aligned bearing housings on a fixed body after removal of a rotary shaft mounted in the bearing housings from the body, the plurality of bearing housings including a pair of opposed end bearing housings and intermediate bearing housings between the end bearing housings, the boring machine having an elongate rotary boring bar mounted concentrically within said bearing housings with the ends thereof extending outwardly from said opposed end bearing housings; an improved mounting means for the boring bar comprising:

an end mounting member wholly supported by the body positioned between the boring bar and the adjacent end bearing housing for supporting the boring bar thereat, said end mounting member including an inner concentric portion engaging the boring bar and mounted for rotation therewith, an outer concentric portion engaging the inner surface of the adjacent end bearing housing and permitting rotation relative to said inner portion and said boring bar, and adjusting means carried by the outer concentric portion for transverse adjustment of the longitudinal axis of the boring bar and inner concentric portion relative to said outer concentric portion and bearing housing without disassembly of the end mounting members thereby to provide accurate alignment of the boring bar relative to the bearing housings.

9. In a portable boring machine as set forth in claim 8 wherein said end mounting member includes a chuck carrier fitting within the adjacent bearing housing and carrying said outer concentric portions, and a plurality of adjustable wedge elements are positioned within the adjacent bearing housing between said chuck carrier and the inner surface of the adjacent bearing housing; and manual means are provided to move the wedge elements along the longitudinal arm of the boring bar for securing the chuck carrier and associated end mounting member onto said body.

10. In a portable boring machine as set forth in claim 8 wherein said end mounting member includes self-aligning spherical bearings between said inner and outer concentric portions to permit adjustment of the boring bar relative to the adjacent bearing housing with the outer concentric portion remaining stationary with respect to the adjacent bearing housing.

11. In a portable boring machine as set forth in claim 8 wherein said outer concentric portion carries a plurality of radially adjustable jaws to engage said inner concentric portion and thereby adjust the radial spacing between said first and second concentric portions for accurate positioning of said boring bar.

12. A portable boring machine for boring in situ a plurality of spaced axially aligned bearing housings on a fixed body after removal of a rotary shaft mounted on the bearing housings from the body, the plurality of bearing housings including a pair of opposed end bearing housings and intermediate bearing housings between the end bearing housings; said portable boring machine comprising:

an elongate rotary boring bar mounted concentrically within said bearing housings and having ends extending outwardly from the opposed end bearing housings of said plurality of axially spaced bearing housings;

an end mounting member wholly supported by said fixed body adjacent each of the end bearing housings positioned between the boring bar and the associated end bearing housing for supporting the boring bar thereat;

adjusting means carried by each end mounting member to move the boring bar in a transverse direction relative to its longitudinal axis and relative to the adjacent end bearing housing;

an annular boring head mounted on said boring bar for rotation therewith to engage in cutting relation the inner surface of an adjacent bearing housing, said boring head being split into two portions for being easily assembled about said boring bar after said boring bar is positioned within the bearing housings and for being easily disassembled from said boring bar thereafter;

an annular intermediate mounting support positioned about said boring bar and adapted for fitting within a bearing housing for supporting the boring bar thereat, said intermediate mounted support being split into two portions for being assembled about said boring bar after said boring bar is positioned within the bearing housings and for being easily disassembled from said boring bar thereafter, said intermediate mounting support adapted to be positioned within a bearing housing adjacent the bearing housing being machined by said boring head for supporting the boring bar immediately adjacent the boring head; and mean to rotate said boring bar and boring head thereon relative to th bearing housings.

13. A portable boring machine as set forth in claim 12 wherein means mount said boring head for axial movement along the length of said boring bar during rotation of said boring bar thereby to permit said boring head to follow a helical travel path during the machining operation.

14. A portable boring machine as set forth in claim 13 wherein said means mounting said boring head for axial movement comprises a threaded screw carried by said boring bar and means to rotate said threaded screw, said boring head engaging said threaded screw for axial movement along the length of said boring bar.

15. In a portable boring machine for boring in situ a plurality of spaced axially aligned bearing housings on a fixed body after removal of a rotary shaft mounted on the bearing housings from the body, the plurality of bearing housings including a pair of opposed end bearing housings and intermediate bearing housings between the end bearing housings, the boring machine having an elongate rotary boring bar mounted concentrically within said bearing housings with an end thereof extending outwardly from an end bearing housing, and a boring head mounted on said boring bar for machining the inner surface of a bearing housing;

improved drive means for rotating said boring bar and boring head thereon, and for moving said boring head along said boring bar during rotation thereof in a helical path relative to the adjacent bearing housing, said improved drive means comprising:

a threaded screw carried by said boring bar, said boring head being connected to said screw for axial movement along the length of said boring bar during rotation of said boring bar;

a drive motor mounted adjacent one end of said boring bar; and means operatively connecting the drive motor to said screw and to said boring bar to rotate said screw and boring bar at different rotational speeds, said means including a drive shaft extending from said motor and a pair of drive sprockets mounted on said drive shaft, one of said drive sprockets operatively connected to said boring bar for rotation thereof and the other of said drive sprockets operatively connected to said screw for rotation thereof.

* * * * *